(12) United States Patent
Endicott et al.

(10) Patent No.: US 6,702,381 B2
(45) Date of Patent: Mar. 9, 2004

(54) UNIVERSAL BLANKET AND REMOVABLE SAFETY BELT FOR USE WITH A VARIETY OF CHILD'S SEAT ASSEMBLIES

(76) Inventors: G. Joan Endicott, 355 Obetz Rd., Columbus, OH (US) 43207; Dawn R. Ludwick, 7555 Racel St., Las Vagas, NV (US) 89131

( * ) Notice: Subject to any disclaimer, the term of this patent is extended or adjusted under 35 U.S.C. 154(b) by 0 days.

(21) Appl. No.: 10/165,346

(22) Filed: Jun. 6, 2002

(65) Prior Publication Data

US 2003/0227202 A1 Dec. 11, 2003

(51) Int. Cl.[7] .................................................. A47D 1/10

(52) U.S. Cl. ........................... 297/256.17; 297/219.12; 297/229

(58) Field of Search ........................... 297/256.17, 229, 297/219.12

(56) References Cited

U.S. PATENT DOCUMENTS

| | | |
|---|---|---|
| 1,538,538 A | 5/1925 | Wood |
| 2,652,183 A | 9/1953 | Hlivka |
| 3,578,380 A | 5/1971 | Jacobus |
| 3,962,738 A | 6/1976 | Menditto |
| 4,188,065 A | 2/1980 | Meeker |
| D257,084 S | 9/1980 | Fuller et al. |
| 4,241,458 A | 12/1980 | Lesesne |
| 4,324,430 A * | 4/1982 | Dimas, Jr. et al. ...... 297/256.17 |
| D266,802 S | 11/1982 | Gooding |
| 4,416,462 A | 11/1983 | Thompson |
| D275,634 S | 9/1984 | Schutz |
| 4,478,453 A | 10/1984 | Schutz |
| 4,568,125 A * | 2/1986 | Sckolnik ................. 297/229 X |
| 4,621,004 A * | 11/1986 | Madsen ................... 297/229 X |
| 4,651,366 A | 3/1987 | Lande et al. |
| D289,123 S | 4/1987 | Tennen |
| 4,655,502 A | 4/1987 | Houllis |
| 4,666,207 A | 5/1987 | Quartano |
| D296,730 S | 7/1988 | Fetterman |
| 4,773,101 A | 9/1988 | Kapp et al. |
| 4,805,935 A | 2/1989 | Grayson |
| 4,805,937 A | 2/1989 | Boucher et al. |
| 4,840,841 A | 6/1989 | Madsen |
| 4,883,701 A | 11/1989 | Rankin et al. |
| 4,885,200 A | 12/1989 | Perdelwitz et al. |
| D308,614 S | 6/1990 | Gordon |
| 4,946,221 A | 8/1990 | Livingston |
| 4,993,090 A | 2/1991 | Ranalli |
| 5,238,293 A | 8/1993 | Gibson |
| D339,950 S | 10/1993 | Jung |
| D342,835 S | 1/1994 | Mink |
| 5,330,250 A | 7/1994 | Reyes |
| 5,437,061 A | 8/1995 | Kenner |
| 5,549,354 A | 8/1996 | Rosen |
| D380,118 S | 6/1997 | Ford |
| 5,678,888 A | 10/1997 | Sowell et al. |
| D393,172 S | 4/1998 | Brady |
| 5,781,946 A | 7/1998 | McEntire et al. |
| 5,829,835 A | 11/1998 | Rogers et al. |

(List continued on next page.)

*Primary Examiner*—Peter M. Cuomo
*Assistant Examiner*—Rodney B. White
(74) *Attorney, Agent, or Firm*—Mueller and Smith, LPA

(57) ABSTRACT

Disclosed is a kit for covering a seat assembly and securing a child therein. The kit includes a generally rectangular blanket large enough to cover areas of the seat assembly within the immediate adjacency of a seated child. The blanket includes at least one leg opening to mate with the leg aperture of the seat assembly. It also includes at least one restraint opening. The kit includes a removable safety belt that may be threaded through the blanket restraint opening to secure the child in the covered seat assembly. Also disclosed is the combination of such a blanket and safety belt in combination with a seat assembly including a back portion, a seat, oppositely disposed side bars, and a front portion having at least one aperture to accommodate the legs of a child.

8 Claims, 6 Drawing Sheets

U.S. PATENT DOCUMENTS

| | | | |
|---|---|---|---|
| 5,855,412 A | * 1/1999 | Smith et al. | 297/256.17 |
| 5,897,165 A | 4/1999 | Kucharczyk et al. | |
| 5,967,606 A | 10/1999 | Bergh et al. | |
| 5,988,742 A | 11/1999 | Stevens | |
| 5,988,744 A | 11/1999 | Franchak | |
| 6,036,264 A | 3/2000 | Lucree | |
| D423,176 S | 4/2000 | Cherry et al. | |
| 6,129,417 A | 10/2000 | Cohen-Fyffe | |
| 6,142,565 A | 11/2000 | Rieder | |
| 6,186,521 B1 | * 2/2001 | Divoky et al. | 297/256.17 X |
| 6,206,471 B1 | 3/2001 | McGowan | |
| 6,224,152 B1 | * 5/2001 | Hughes et al. | 297/256.17 |
| 6,237,998 B1 | 5/2001 | Aprile | |
| 6,390,552 B1 | * 5/2002 | Veron | 297/256.17 |
| 6,394,543 B1 | * 5/2002 | Dunne et al. | 297/229 X |
| 2001/0048235 A1 | 12/2001 | Hartranft | |

* cited by examiner

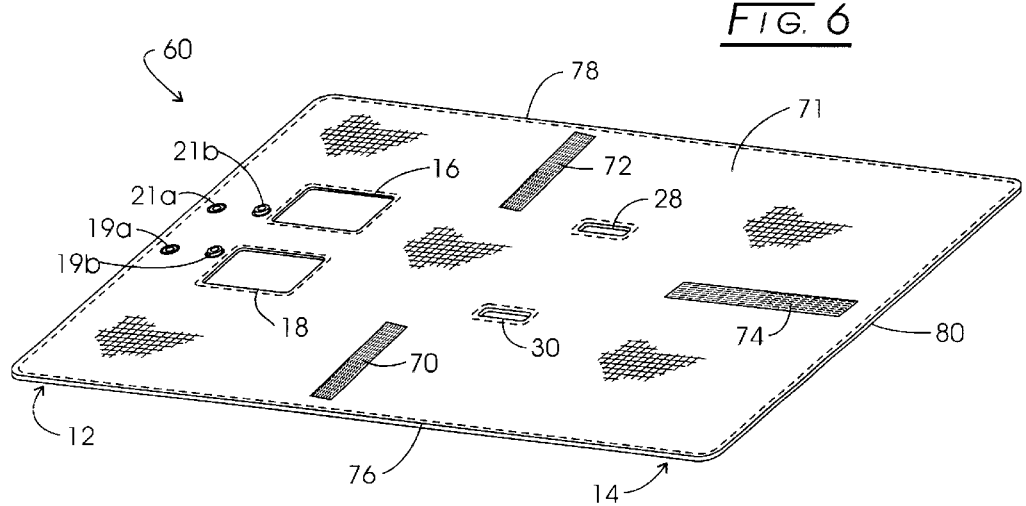
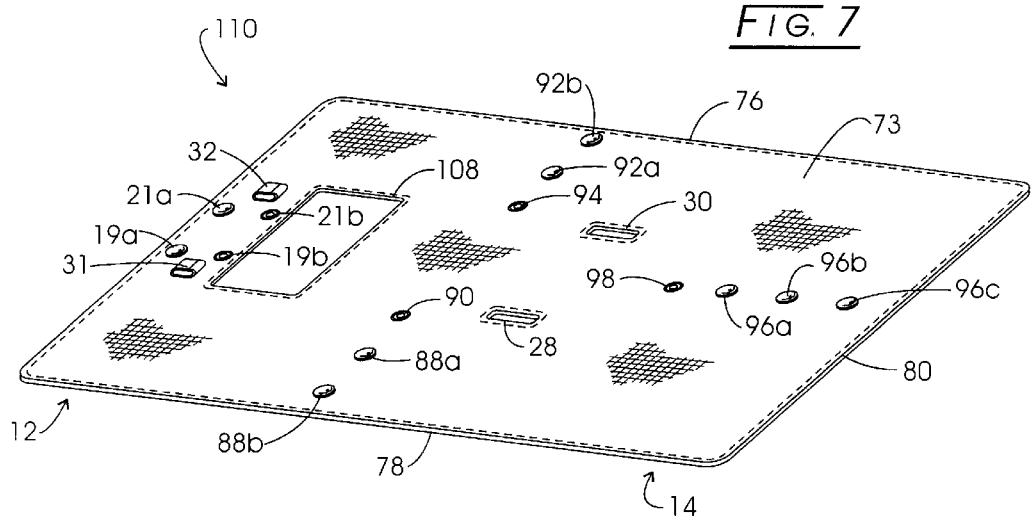

UNIVERSAL BLANKET AND REMOVABLE SAFETY BELT FOR USE WITH A VARIETY OF CHILD'S SEAT ASSEMBLIES

CROSS-REFERENCE TO RELATED APPLICATIONS

None.

STATEMENT REGARDING FEDERALLY SPONSORED RESEARCH

Not applicable.

BACKGROUND OF THE INVENTION

As a convenience to persons with young children, many commercial businesses provide equipment for seating the children and transporting them throughout the establishment. For example, grocery stores provide shopping carts having a child's seat at the front of the cart. Public parks or zoos often provide strollers. Restaurants may provide highchairs to accommodate small children or toddlers. In each case, the carts, strollers, or highchairs usually are made available to the public in a central location. The equipment is selected, used, and then returned to the central location where it will be used again and again by other members of the public.

Generally, this type of equipment is not carefully washed between uses, and concerns have been raised about the sanitary conditions of the seats. For example, customers often return shopping carts to uncovered facilities in the grocery store's parking lot after use. Persons without a child may place food items in the seat assembly. The result is that shopping carts may be tainted with dust, dirt, soil, fecal matter, and bacteria. Strollers, provided for indoor or outdoor use, are subject to these same contaminants. Seat assemblies exposed to food products may become contaminated with *e. coli* bacteria or salmonella. These bacteria and other contaminants are especially harmful to children whose immune systems are not fully developed.

A number of patents address the problem of sanitation for grocery cart seats. For example, U.S. Pat. No. 3,578,380 provides a thin sheet of pliable material that fits over the handle of a grocery cart, covers the seat portion, and is tied behind the back of the seat by means of a drawstring. U.S. Pat. No. 5,967,606 discloses a cushion that fits over a grocery cart like a shower cap. These covers may cover the entire seat area, but are designed to be used only with grocery carts.

U.S. Pat. No. 6,129,417 (commercially available at www.cleanshopper.com) includes a cross-shaped body, the vertical ends of which have pockets that slip over the back edge of the seat assembly and handle of a grocery cart. The sides of the cover body attach to the sides of the child's seat. U.S. Pat. No. 5,678,888 discloses a cover having a rectangular-shaped section with a second section attached to it to form a cross-shaped body. With this design, snaps are provided to attach the cover about the cart handle and the sides and the rear of the child's seat. U.S. Pat. No. 6,237,998 B1 discloses a cover having a front panel, an interior seat liner panel, and a rear flap. Extending from the interior panel are side rail cover flaps that cover the sides of the grocery cart seat. See also, U.S. Pat. No. 4,416,462; U.S. Pat. No. 4,805,937; U.S. Pat. No. 5,829,835; and U.S. Pat. No. Des. 342,835. Even though they are designed to address sanitary issues, cover designs having the noted cross or T-shape disadvantageously leave a portion on the child's seat exposed.

Another problem associated with use of these types of seat assemblies is safety. A child often needs to be restrained in the child's seat to prevent the child from leaning and falling out of the seat. The equipment provider may include a safety belt or other restraint as part of the equipment. However, a restraint often is not provided. If a protective liner is placed in the seat to protect the child from harmful contaminants, it must accommodate any provided restraint. See, for example, U.S. Pat. No. 6,129,417, which includes grommet openings for a belt to pass through to restrain a child. U.S. Pat. No. 5,678,888 discloses a shopping cart cover with a seat belt affixed to it. See also, U.S. Pat. No. 5,238,293; and U.S. Pat. No. 4,651,366. These devices disclose either openings to accommodate a belt provided with the seat assembly or a belt attached to the device to be used where a seat assembly belt is not provided.

Other patents are directed solely to the comfort of the seated child. See, for example, U.S. Pat. No. 4,666,207 which discloses a child's shopping cart seat cushion. The cushion covers the front, bottom and back of the seat, leaving the sides of the cart seat uncovered. A design for another such device is disclosed in U.S. Pat. No. Des. 289,123. The seat pad disclosed in the '123 patent includes a first portion covering the seat and back parts of the child's seat, the first portion being connected to a second portion, which wraps about the grocery cart handle. U.S. Pat. No. Des. 308,614 discloses a design for a protective seat cushion attachment for a shopping cart seat. The design includes padded portions attached to the rear and sides of the child's seat of a grocery cart. See also U.S. Pat. No. Des. 380,118; U.S. Pat. No. Des. 393,172; and U.S. Pat. No. 4,655,502. These designs focus solely on comfort and other concerns, such as sanitation and safety, simply are not addressed. For example, to provide comfort to a seated child, a cushion need only cover the back and seat portions of the seat assembly. The sides are left exposed and, thus, as described above, pose a sanitation risk.

Although there are a number of covers, liners, and cushions addressed to child seat assemblies, these devices generally are specifically designed and intended to be used with a single piece of equipment, i.e., a cushion for a-grocery cart or a cover for a car seat. Improvements in seat covers continue to be sought in order to keep children safe, warm, comfortable, and clean in a variety of seat assemblies.

BRIEF SUMMARY OF THE INVENTION

One aspect of the present invention is addressed to the combination of a seat assembly, a universal blanket, and a removable safety belt. The universal blanket is designed to be used with any seat assembly having a back portion, a seat, oppositely disposed side bars, and a horizontal front bar extending between the side bars and having at least one aperture below the front bar to accommodate the legs of a child. Devices with such a seat assembly may include grocery carts, highchairs, strollers, ordinary chairs with or without arms, etc. Being generally rectangular in shape, the blanket includes at least one leg opening which mates with the leg aperture of the seat assembly when the blanket is positioned in the seat assembly. The blanket is large enough to cover the parts of the seat assembly within the immediate adjacency of the seated child. The safety belt serves the dual purposes of securing the blanket to the back of the seat assembly and securing the child within the seat assembly.

Another aspect of the invention is a method for protecting a child seated in a seat assembly as described above. The method includes the steps of providing the universal blanket with the above-described feature. Then, the blanket is placed in the seat assembly such that the blanket's leg opening is aligned with the leg aperture of the seat assembly and the blanket covers the areas of the seat assembly that will be adjacent the seated child. Next, a removable safety belt is provided. Finally, the safety belt is threaded through a restraint opening in the blanket so that it can be secured either in front of or behind a seated child.

Advantages of the present invention include a blanket that function as a blanket. Another advantage is a blanket that also can function to cover a variety of seating devices to provide comfort and safety/protection for a child seated in the seating device. A further advantage is that the inventive blanket in a kit, which makes the blanket adaptable to be used on ordinary chairs (with or without arms) to provide a "highchair-like" seat for the child. These and other advantages will be readily apparent to those skilled in the art based on the disclosure set forth herein.

BRIEF DESCRIPTION OF THE DRAWINGS

For a fuller understanding of the nature and advantages of the present invention, reference should be had to the following detailed description taken in connection with the accompanying drawings, in which:

FIG. 6 is a perspective view of a the back of the embodiment illustrated in FIG. 4;

FIG. 7 is a perspective view of a third embodiment of the universal blanket;

The drawings will be described in greater detail below.

DETAILED DESCRIPTION OF THE INVENTION

The present invention addresses a universal blanket or quilt designed to be easily carried throughout the day and used with a variety of child's seat assemblies, such as the seat of a grocery cart, a highchair, a stroller, etc. However, when not being used with a seat assembly, the invention may be used as a conventional blanket. When positioned in a seat assembly, the generally rectangular-shaped blanket covers the areas of the seat assembly that the child may contact. Thus, the universal blanket performs an important sanitary function, protecting the seated child from contaminants, such as dirt and bacteria. The blanket also provides a warm and comfortable liner for the child to sit upon. The blanket further includes a safety feature in the form of a removable safety belt, which extends about the back of the seat assembly, through restraint openings in the blanket, and about the seated child. A fastener is provided as part of the safety belt that may be affixed either in front of the child or behind the back of the seat assembly. Because the safety belt is removable, if the seat assembly includes its own restraint, the seat assembly restraint may be threaded through the restraint openings of the blanket. Alternatively, the seat assembly restraint and safety belt may be used together. The inventive blanket is flexible enough in design that a kit, that includes the inventive blanket and a pair of safety belts, can be adapted for use in an ordinary chair to provide a highchair-like seating assembly for the child.

Throughout this application, the word child is used primarily to indicate infants and toddlers. Infants and toddlers, for example, may be children aged 6 months to 4 years. An adult's sanitation and safety concerns will be greater for a younger child than for an older one. However, it will be appreciated that the invention may be used for primary or elementary age children who can be seated in the below described seat assemblies, e.g., a grocery cart seat.

Figure 1:
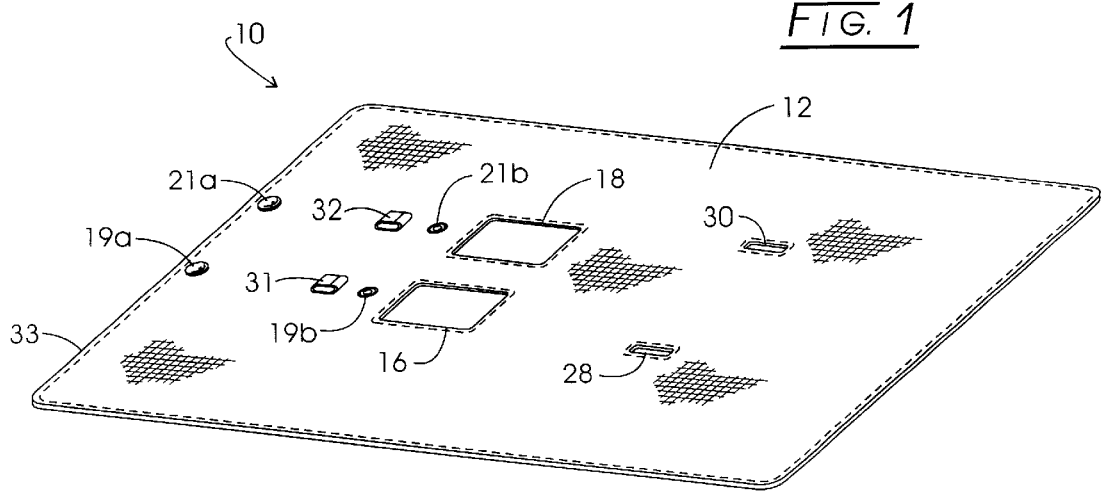
FIG. 1 is a perspective view of one embodiment of the universal blanket.

FIG. 1 illustrates one embodiment of the universal blanket shown generally at 10. Blanket 10 is seen to have a generally rectangular configuration and includes a front surface, 12, and a back surface, 14 (not shown). The dimensions of blanket 10 are those of a conventional child's blanket. For example, blanket 10 may have a length of about 44 inches and a width of about 34 inches. In its simplest form, blanket 10 may be formed of a single piece of material or fabric. Preferably, the material or fabric is washable, durable, warm, soft, and stain resistant. To provide additional comfort and warmth, blanket 10 may be composed of two sheets of material with one or more of batting, padding, or insulation in between. For aesthetic purposes, blanket 10 may be formed of material having a colorful pattern or design. The shape of blanket 10 may vary from a strictly rectangular configuration to provide blanket 10 with aesthetic appeal so long as the variations do not affect its ability to function as a blanket. For example, the corners of blanket 10 may be rounded or beveled. Also, the sides of blanket 10 may be serpentined.

Extending through blanket 10 are a pair of leg openings, 16 and 18. One or more fasteners may be provided to attach one or more of the edges of blanket 10 to a seat assembly. A fastener for present purposes means a device having two mating elements, inter alia, a snap fastener, eye and hook Velcro®, a frog and braid, a button and buttonhole, two pieces of string or ribbon, etc. For convenience, the mating elements illustrated are referred to simply as male and female components, however, these terms are intended to include any two elements that fasten together whether of similar or dissimilar construction.

As shown in FIG. 1, a pair of snap fasteners, 19 and 21, optionally are provided on front surface 12 to attach the front edge, 33, of blanket 10 to a seat assembly. This attachment is effected by connecting female components of snap fasteners 19 and 21, located at 19a and 21a, which mate with corresponding male components, the backs of which are shown at 19b and 21b, respectively. Such attachment with respect to a seat assembly is described in greater detail below. Although blanket 10 is shown with a pair of snap fasteners, the number and type of such fasteners may vary.

In FIG. 1, a plurality of snaps or other discrete fasteners are provided to attach front edge 33 substantially across its entire length. It should be recognized that certain fasteners, such as Velcro®, may be elongated to extend across the length of the edge. Such an elongated fastener is equivalent to a plurality of discrete fasteners.

Blanket 10 also includes a pair of rectangular restraint openings, 28 and 30. These openings extend through blanket 10 and are configured to permit a safety belt (54 in FIG. 2) to be threaded through them. The size and shape of restraint openings 28 and 30 may vary. A pair of loops, 31 and 32, are connected to blanket 10 on front surface 12. Toys or other items to entertain the child may be attached to loops 31 and 32, for example, by Velcro®.

Figure 2:
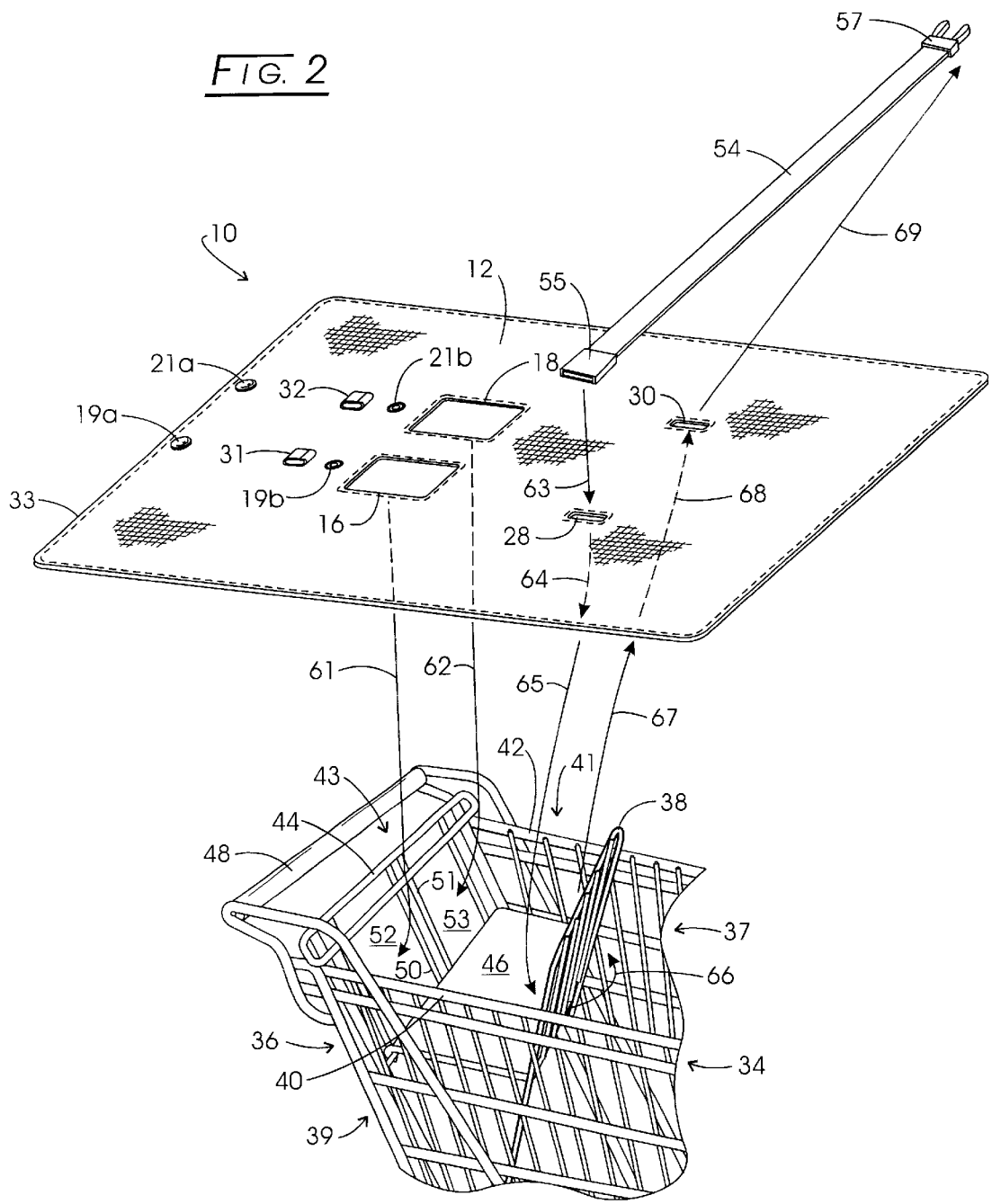
FIG. 2 is a perspective view of the universal blanket illustrated in FIG. 1 and a removable safety belt being positioned in the seat assembly of a grocery cart.

FIG. 2 illustrates how blanket 10 is positioned and secured within the seat assembly, 36, of a conventional grocery cart, 34. Seat assembly 36 is formed of a plurality of generally horizontal and vertical wire bars. Seat assembly 36 includes a back portion, 37, the upper bar of which is shown at 38. Extending outwardly from the bottom of back portion 38 is a seat, 46. A pair of oppositely disposed sidebars, 40 and 42, define the upper edges of sides 39 and 41, respectively. A front portion 43 completes seat assembly 36 and includes a horizontal front bar, 44, extending between sidebars 40 and 42 and a pair of vertical front bars, 50 and 51, which define a pair of leg apertures 52 and 53. Disposed outwardly from seat assembly 36 and extending substantially parallel to horizontal front bar 44 is a handle, 48. Not all grocery carts have seat assemblies with features identical to those shown in FIG. 2. However, while the features of the seat assemblies may vary slightly, the basic structure will be as described herein. For example, while seat assembly 36 includes a pair of vertical front bars, the seat assemblies of some grocery carts may have only a single bar. Also, as an example, some grocery carts include only horizontal front bar 44, a separate handle as at 48 not being provided.

Figure 3:
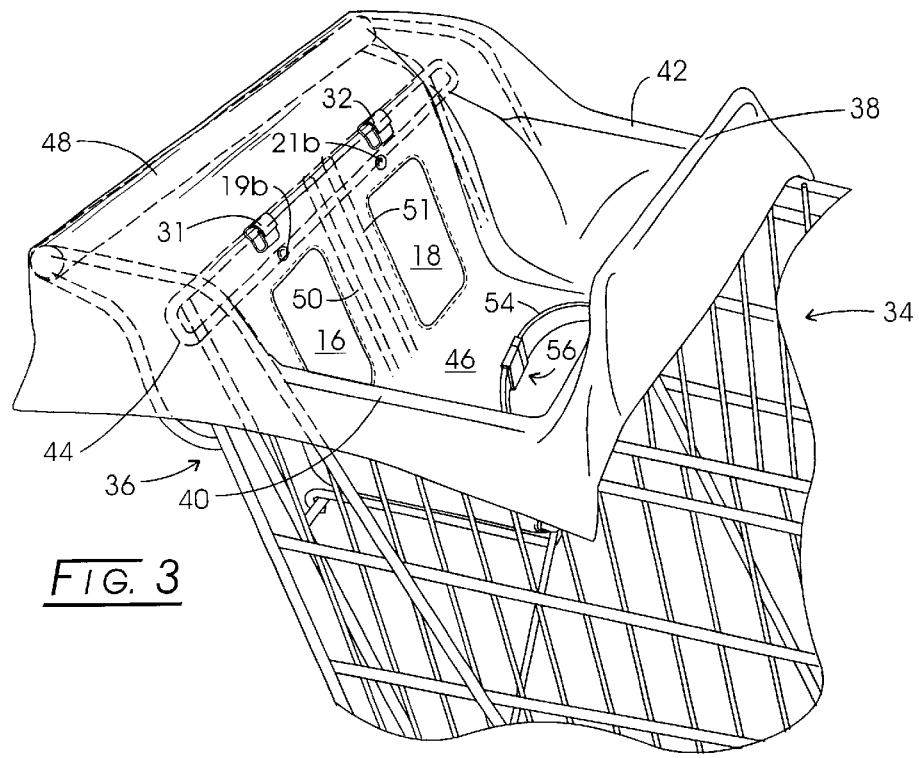
FIG. 3 is a perspective view of the universal blanket illustrated in FIG. 1 positioned in the seat assembly of a grocery cart.

In use, blanket 10 is positioned such that leg openings 16 and 18 correspond to leg apertures 52 and 53 of grocery cart seat 36, as indicated by arrows 61 and 62. Once leg openings 16 and 18 are aligned, blanket 10 is laid in seat assembly 36. As shown in FIG. 3, when placed in seat assembly 36, blanket 10 covers all of seat assembly 36 within the immediate vicinity of a seated child including seat 46, and the interior surfaces and upper edges of back portion 37, sides 39 and 41, and front portion 43. To better illustrate how blanket 10 covers seat assembly 36, certain portions of seat assembly 36 covered by blanket 10 are shown in phantom in FIG. 3. Blanket 10 may be larger, such that a portion of the exterior surfaces of seat assembly 36 are covered, however, at a minimum the interior and upper edges of seat assembly 36 must be covered. Thus, blanket 10 acts as a protective cover shielding the seated child from contaminants, such as dust, dirt, soil, fecal matter, and bacteria.

Blanket 10 need not be fastened to seat assembly 36 other than by means of a safety belt or restraint as described below. However, to further hold blanket 10 in place, various sides of blanket 10 may be connected to portions of seat assembly 36. For example, as illustrated in FIG. 3, front edge 33 may be attached to handle 48 by snaps 19 and 21. As shown, front edge 33 is wrapped over the top of handle 48 with snap fasteners 19 and 21 connecting below handle 48. However, edge 33 also may be inserted between horizontal front bar 44 and handle 48 and wrapped around handle 48 with snap fasteners 19 and 21 connecting above handle 48. For the latter configuration, both the female and male components of snap fasteners 19 and 21 would be provided on the same surface, i.e., surface 12, of blanket 10. Providing the snap fasteners in this manner would allow blanket 10 to be reversible. When placed in seat assembly 36 with the snap fasteners showing, edge 33 would be wrapped under handle 48. If blanket 10 is placed in seat assembly 36 with the snap fasteners facing downwardly, front edge 33 would be wrapped over handle 48. The connection of blanket 10 to seat assembly 36 will be described in further detail below in connection with FIGS. 4–7.

Looking back to FIG. 2, a removable safety belt 54 is shown having a pair of fastening elements 55 and 57 at either end. Safety belt 54 acts both to secure blanket 10 to seat assembly 36 and to secure a child within seat assembly 36. Removable safety belt 54 may be attached to seat assembly 36 by threading element 55 through restraint opening 28 as indicated by arrows 63 and 64. Fastening element 55 then is inserted between two of the vertical bars comprising back portion 37 as indicated by arrow 65. Safety belt 54 extends across a part of the exterior of back portion 37 as indicated by arrow 66. Fastening element 55 then is threaded between two vertical bars of back portion 37 and through restraint opening 30 of blanket 10 as indicated by arrows 67, 68, and 69. When threaded as shown, fastening elements 55 and 57 may be fastened together in front of a seated child as shown in FIG. 3. If fastening elements 55 and 57 are threaded from the front of blanket 10 through restraint openings 28 and 30, respectively, elements 55 and 57 may be fastened behind back portion 37. With the latter configuration, fastener 56 is advantageously out of the reach of the child.

Fastening elements 55 and 57 are shown as clasp and prong elements, respectively, however, it will be obvious to one of ordinary skill in the art that other conventional fasteners may be used. For example, fastening elements 55 and 57 may be formed of strips of Velcro®. Safety belt 54 may be formed of conventional materials including a variety of natural and synthetic fiber fabrics.

Sometimes grocery cart 34 will be provided with a restraint (not shown). For example, seat assembly 36 may include a pair of restraint elements connected to the interior of back portion 37 and having fastening means. If seat assembly 36 includes such a restraint, the ends of the seat assembly restraint may be threaded through restraint openings 28 and 30 and fastened in front of the child. When attached in this manner, the seat assembly restraint secures both blanket 10 and a seated child. The grocery cart restraint may be used either alone or in conjunction with safety belt 54. Because safety belt 54 is removable, it provides the user with the flexibility of securing the seated child with safety belt 54 alone, with safety belt 54 in combination with a seat assembly restraint, or with a seat assembly restraint alone. So that safety belt 54 is not separated from blanket 10 or lost, one end of safety belt 54 may be removably attached to blanket 10. For example, once fastening element 55 is threaded through restraint opening 28, opening 28 may be held closed by a strip of Velcro® attached to surface 12, a snap fastener whose components are sewn on surface 12 on either side of restraint opening 28, etc. Thus, safety belt would still be removable, but less likely to become separated or lost. Alternatively, once elements 55 and 57 are threaded through openings 28 and 30, safety belt 54 may be permanently attached to blanket 10.

Figure 4:
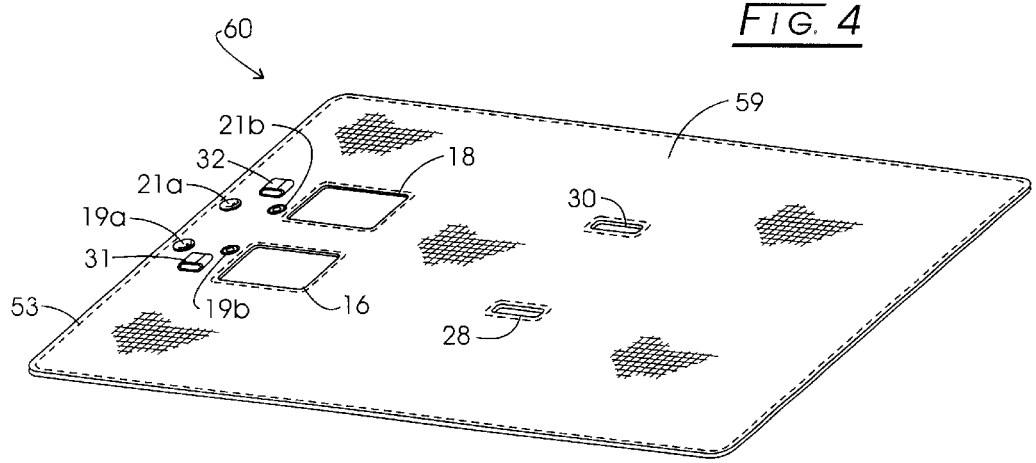
FIG. 4 is a perspective view of another embodiment of the universal blanket.
Figure 5:
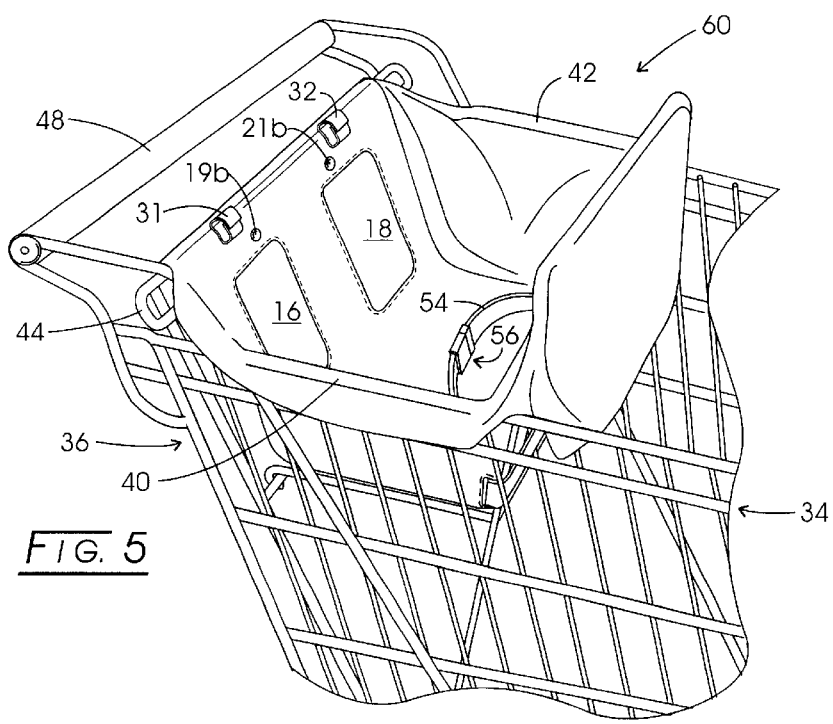
FIG. 5 is a perspective view of the embodiment illustrated in FIG. 4 positioned in the seat assembly of a grocery cart.

Turning now to FIGS. 4 and 5, an alternative embodiment of the blanket of the invention is illustrated at 60. Previously identified blanket and seat assembly components retain their earlier numeration. In this embodiment, certain components located on the front surface, 59, of blanket 60 including female components 19b and 21b, and loops 31 and 32, and leg openings 16 and 18 are located in closer proximity to the front edge, 58, of blanket 60. With this configuration, front edge 58 may be wrapped about horizontal front bar 44, leaving handle 48 uncovered as shown in FIG. 4. Snap fasteners 19 and 21, when connected, secure front edge 58 in this configuration.

As shown in FIGS. 6 and 7, fasteners may be provided to more securely attach blanket 60 to cart seat 36. FIG. 6 shows the back surface 71 of blanket 60, which includes three Velcro® strips, 70, 72, and 74. Velcro® strip 70 is used to fasten blanket side, 76 to sidebar 42 of seat 36. Similarly, Velcro® strip 72 is used to fasten blanket side 78 to opposite sidebar 40. Velcro® strip 74 may be used to fasten the blanket back, 80, to the back of seat 36. When wrapped about a bar of the seat assembly, a portion of each Velcro® strip may be attached in convention fashion to another portion of the strip to secure the blanket. The length of the Velcro® strips conveniently accommodates cart seats having differing depths.

FIG. 7 shows the front surface of blanket 60 with three sets of snap fasteners instead of three Velcro® strips as shown in FIG. 6. The first set of snap fasteners includes two female snap components, 88a and 88b, and a male snap component, 90. When edge 78 is wrapped about sidebar 40, female component 88a will mate with male component 90. For a grocery cart with a deeper seat assembly and a correspondingly higher sidebar, female component 88b may alternatively be mated with male component 90. Similarly, the second set of snap fasteners includes two female components, 92a and 92b, and a male component, 94. These components may be used to fasten edge 76 to sidebar 42. For fastening the back edge 80 of blanket 10 to the back 38 of seat 36, a third set of snap fasteners are provided. In order to provide a greater height accommodation for back 38, three female components, 96a, 96b, and 96c, are provided, one of which will be mated with male component, 98.

As will be readily apparent to one of ordinary skill in the art, the male components may be provided on front surface 73 and the female components on back surface 71. Also, the type of fastener, as well as the number and positioning of fasteners, may vary as described above in connection with FIG. 1. Although described in connection with embodiment 60, such fasteners may be provided in similar fashion on the surfaces of all of the embodiments disclosed herein. Also as described in connection with FIG. 1, a plurality of discrete fasteners or an elongated fastener may be provided to fasten one or more of the edges, 76, 78, or 80, substantially across its entire length.

Although it is preferred that the universal blanket, i.e. embodiments 10 and 60, be constructed having a pair of leg openings as shown in FIGS. 1–6, a single leg opening, 108, also may be provided. With this configuration, leg opening 108 would correspond to the two leg openings defined by vertical front bars 50 and 51 (FIG. 3) or the single leg opening of a seat assembly without a vertical front bar.

Figure 8:
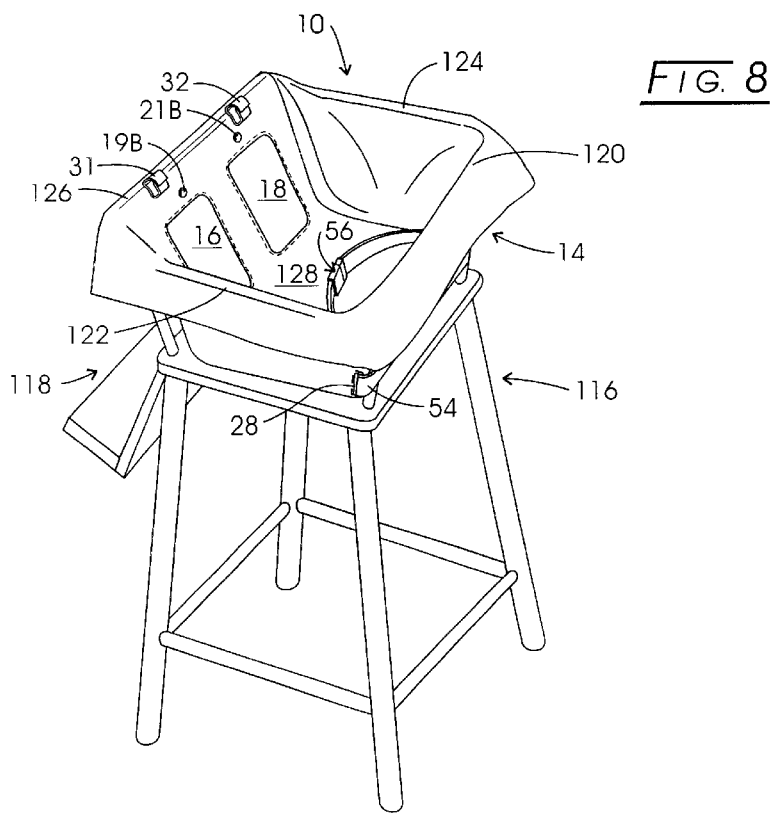
FIG. 8 is a perspective view of the embodiment illustrated in FIG. 4 positioned in the seat assembly of a highchair.
Figure 9:
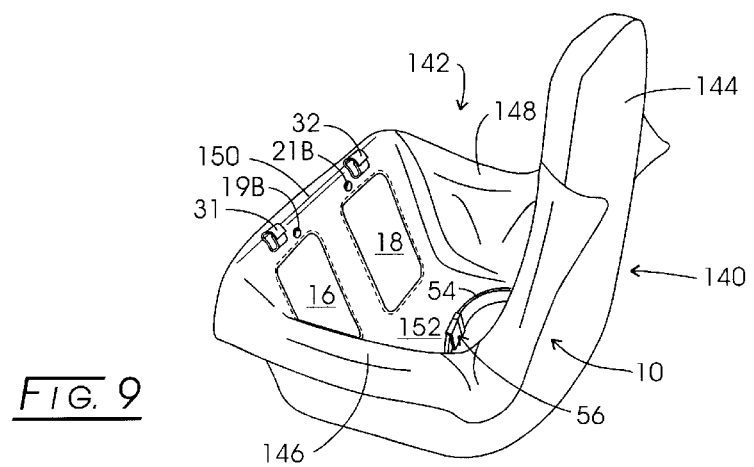
FIG. 9 is a perspective view of the embodiment illustrated in FIG. 1 positioned in the seat assembly of a car seat.

One of the major benefits of the universal blanket is that it can be used with any child seat assembly having a back, oppositely disposed sidebars, a horizontal front bar extending between the sidebars, and a seat. FIGS. 8 and 9 show the versatility of the blanket in that it may be used not only with a grocery cart, but also with a highchair or car seat. Although not illustrated, the blanket also may be used with a stroller. The blanket provides the same benefits when used with the seat assemblies of these devices as with a grocery cart seat, namely, it provides a sanitary, comfortable, and safe cover.

In FIG. 8, the universal blanket, for example embodiment 60, is shown covering a highchair. The highchair, 116, is shown having a seat assembly 118. Seat assembly 118 includes a back 120, oppositely disposed sidebars, 122 and 124, a horizontal front bar 126 extending between sidebars 122 and 124, a vertical front bar (not shown), and a seat, 128. Seat assembly 118 generally will be smaller than the seat assembly of a grocery cart. As such, blanket 60 will easily cover the exposed areas of highchair seat 118. Snap fasteners 19 and 21 may be used to fasten front edge 58 about horizontal front bar 126.

Removable safety belt 54 again is provided with blanket 60. As with the grocery cart seat, safety belt 54 may be fastened either in front of the child or behind the exterior of back 120. If a safety belt is provided with highchair 116, it may be used instead of or addition to safety belt 54 as described above.

FIG. 9 illustrates the use of blanket 60 with a car seat, 140. Car seat has a seat assembly 142 including a back 144, oppositely disposed sides, 146 and 148, a horizontal front bar 150 extending between sides 146 and 148, a vertical front bar (not shown) and a seat, 152. When used with car seat 140, blanket 60 may simply be draped over seat assembly 142, the sides of blanket 60 not being fastened to seat assembly 142.

To accommodate more than one child, some grocery carts, strollers, etc., include two seat assemblies either in a tandem or a side-by-side configuration. While the universal blanket has been described above in connection with a single seat assembly, it will be readily apparent that the blanket may be adapted to be used with devices having more than one seat assembly. For example, some stores provide grocery carts having two seat assemblies in a front-to-back, i.e., tandem, configuration. Each seat assembly includes all of the seat assembly components described in connection with FIG. 2. Universal blanket 10 illustrated in FIG. 1 may be provided in redundancy, having twice the shown length, a second pair of both leg openings and restraint openings, and a second removable seat belt.

Figure 10:
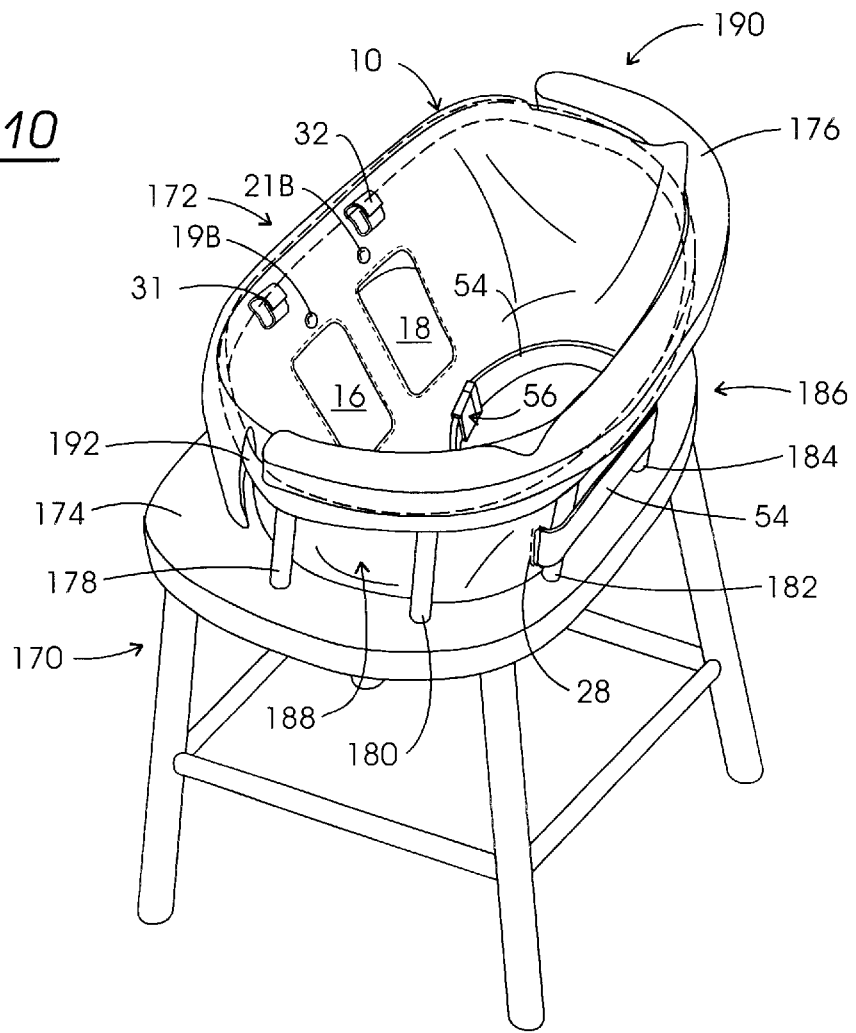
FIG. 10 is a perspective view of the embodiment illustrated in FIG. 1 positioned in the seat assembly of a chair.

The universal blanket, for example embodiment 10, also may be used with a seat assembly having only a back, a seat, and sides as shown in FIG. 10. Generally, a child's seat assembly will have a seat, a back, sides, and a front to completely enclose the seated child. However, by providing a second removable safety belt, blanket 10 may be used with a seat assembly not having a front bar. For example, such a seat assembly may be part of a common household chair. This configuration is illustrated in FIG. 10. Shown in FIG. 10 is a chair, 170, having a seat assembly shown generally at 172. Seat assembly 172 includes a seat, 174, a curved support, 176, supported by a plurality of vertical support bars, four of which are shown at 178, 180, 182, and 184. Curved support 176 and the plurality of vertical support bars form back 186 and sides 188 and 190 of seat assembly 172.

In use, blanket 10 is placed in seat assembly 172 and safety belt 54 is threaded through restraint openings 28 and 30 (not shown), about vertical support bars 182 and 184. A second safety belt, 192, shown in phantom extends about curved support 176 and across the front of seat assembly 172. Safety belt 192 may be fastened in this position with a fastener (not shown), for example, similar to that provided as part of safety belt 54. Front edge 58 of blanket 10 is wrapped about safety belt 192 as shown and held in place by snaps 19 and 21. Safety belt 192 secures blanket 10 to seat assembly 172 and provides an additional restraint to prevent a seated child from falling out of seat assembly 172. Using blanket 10 with safety belt 192 allows a conventional chair to serve as a highchair for an infant or toddler.

Although illustrated with a seat assembly with a back and sides, it will be readily apparent to one of ordinary skill in the art that blanket 10, safety belt 54, and safety belt 192 also may be used to cover a seat assembly having only a seat and a back.

While the invention has been described with reference to a preferred embodiment, those skilled in the art will understand that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims. In this application all units are in the metric system and all amounts and percentages are by weight, unless otherwise expressly indicated. Also, all citations referred herein are expressly incorporated herein by reference.

We claim:

1. A kit adapted for use with a grocery cart having a seat assembly including a back with an interior surface and an exterior surface, oppositely disposed side bars connected to said back, a horizontal front bar spaced apart from said back and extending between said side bars, and at least one aperture to accommodate the legs of a child, and a seat extending between said side bars and between said horizontal front bar and said back, which comprises:

(a) a substantially rectangular blanket having an area sufficient to cover said seat assembly within the immediate adjacency of a child when seated in said seat assembly, having at least one leg opening located to mate with said seat assembly aperture when said blanket is positioned in said seat assembly, having a front edge, and having at least one restraint opening;

(b) a removable safety belt adapted to extend through said restraint aperture, about a portion of said exterior of said back, and about said child, said removable safety belt carrying a pair of fastening elements mutually engageable with one another and being fastenable at one or more of in front of said child or behind said back for securing said blanket and said child to said seat assembly and (c) a second removable safety belt including a pair of fastening elements mutually engageable with one another;

wherein said blanket is adapted for use with a seat assembly including a back with an interior surface and an exterior surface, and a seat connected to and extending outwardly from said back on which may be seated a child;

said second removable safety belt being adapted to extend about said exterior of said back and about said child when seated on said seat and is fastenable at one or more of in front of said child or adjacent said back exterior surface for securing said blanket and said child to said seat assembly, said blanket front edge being configured to be folded over a portion of said second safety belt when said second safety belt is fastened about said seat assembly.

2. The kit of claim 1, wherein:

said grocery cart further includes a vertical front bar extending between said horizontal front bar and said seat to define a pair of leg apertures, and said at least one leg opening of said blanket comprises a pair of leg openings located to mate with said seat assembly leg apertures when said blanket is positioned within said seat assembly.

3. The kit of claim 2 wherein:

said grocery cart includes a handle outwardly disposed from and parallel to said horizontal front bar, and said blanket includes a front edge and at least a pair of snap fasteners for securing said front edge of said blanket to said handle, each said fastener having a male component and a female component, said female components being located on said front surface and said male components being located on said back surface.

4. The kit of claim 3 wherein said blanket is a laminate structure having a top layer and a bottom layer with an intermediate layer disposed therebetween.

5. The kit of claim 4 wherein said top layer and said bottom layer are formed of fabric and said intermediate layer is formed of one or more of batting, padding or insulation.

6. The kit of claim 5 wherein at least one loop for attaching a child's toy is connected to said front surface of said blanket.

7. The kit of claim 1 wherein:

said blanket is adapted for use with a seat assembly including a back with an interior surface and an exterior surface, a pair of oppositely disposed sides, each having an exterior surface, and a seat connected to and extending outwardly from said back on which may be seated a child; and said second removable safety belt is adapted to extend about said exterior of said back and about said exterior surface of each said side.

8. The kit of claim 1 wherein said blanket includes at least one fastener for fastening said front edge of said blanket when said front edge is folded over said portion of said second safety belt.

* * * * *